Patented Jan. 5, 1954

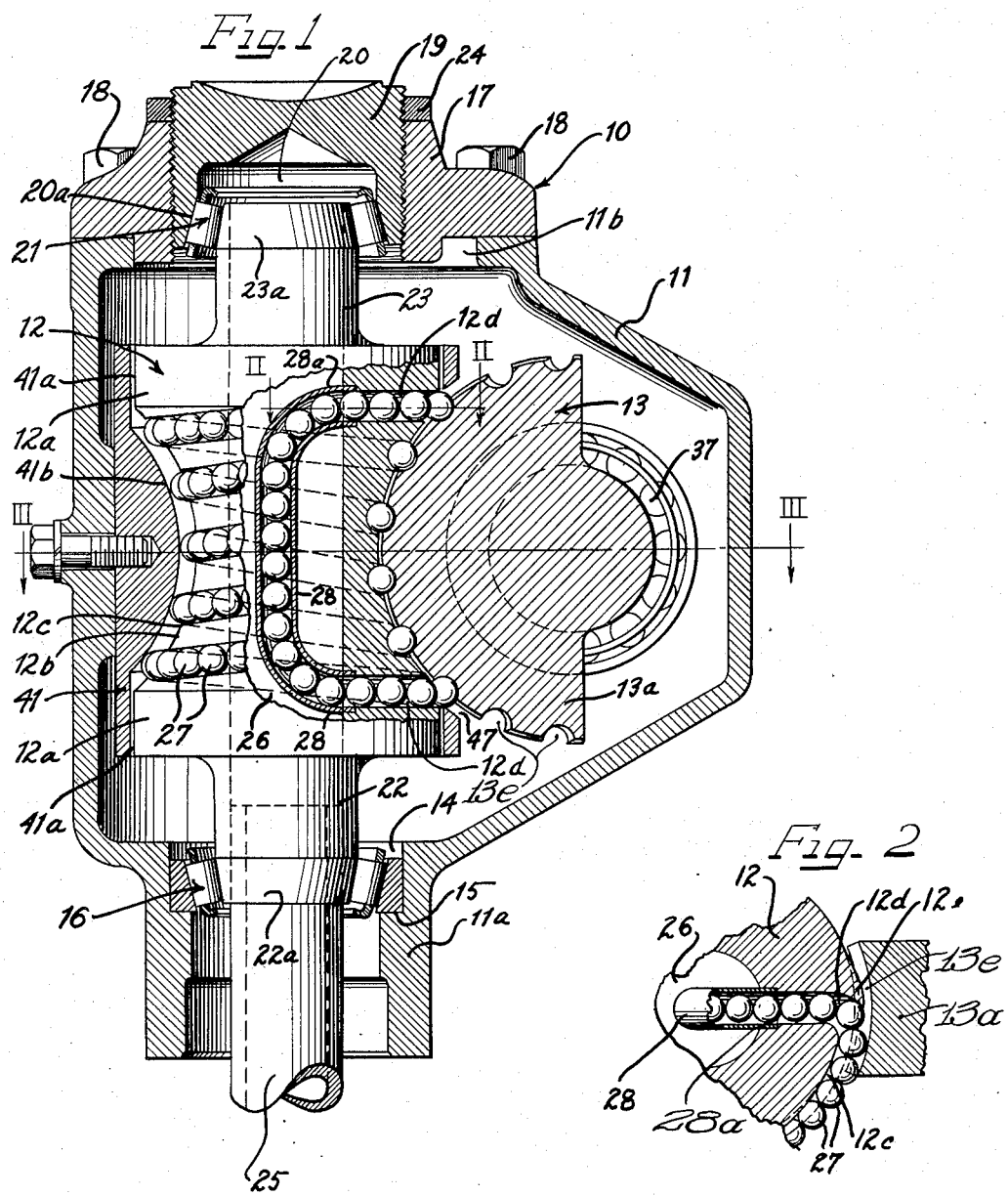

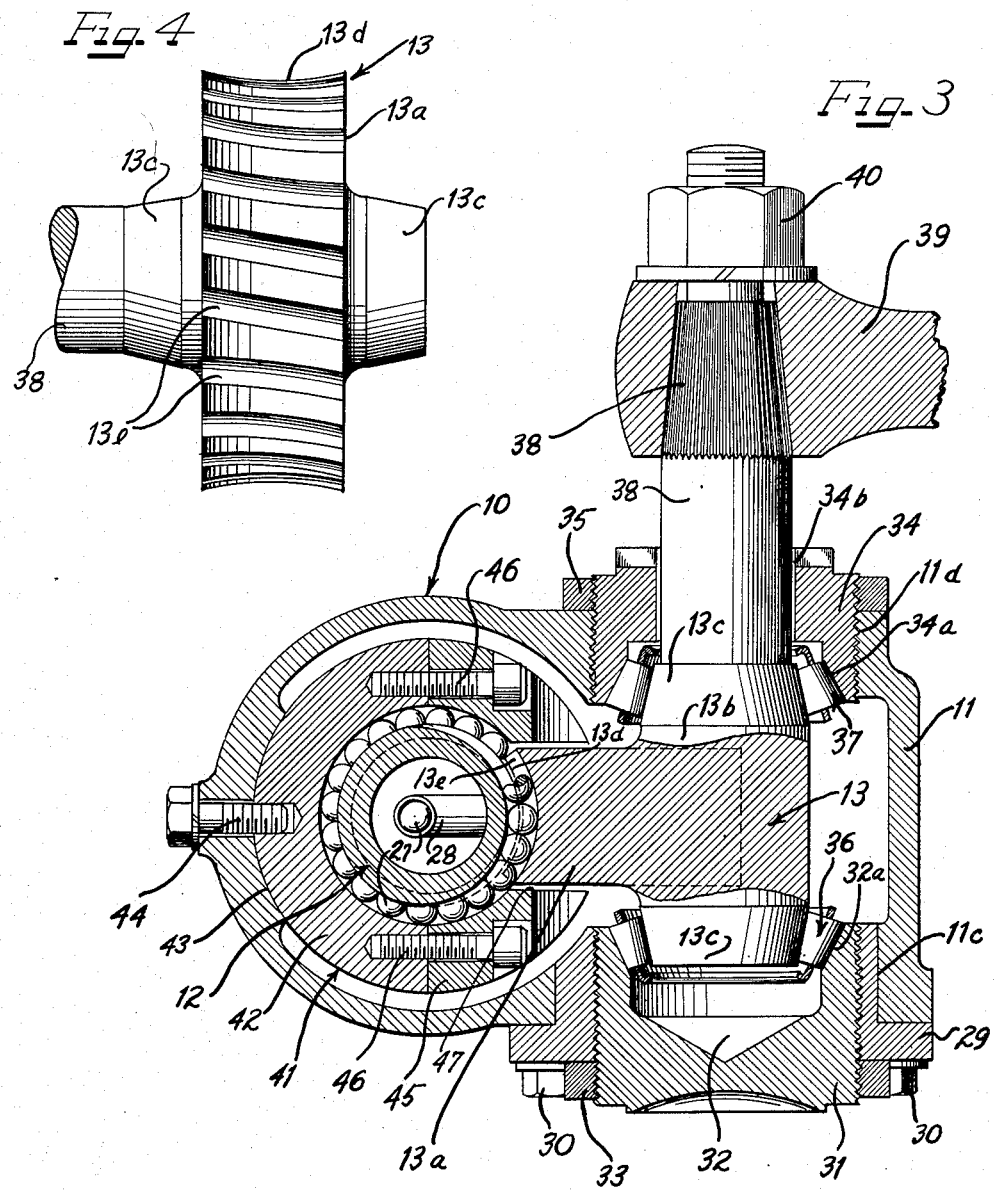

2,664,760

UNITED STATES PATENT OFFICE 2,664,760

ANTIFRICTION GEAR ASSEMBLY

James H. Booth, Venice Township, Shiawassee County, Mich., assignor to Thompson Products, Inc., Cleveland, Ohio, a corporation of Ohio Application February 20, 1951, Serial No. 211,948

4 Claims. (Cl. 74—458)

1

This invention relates to a gear assembly utilizing ball bearings to mesh together a pair of mating members.

Particularly, the invention relates to an antifriction ball bearing steering gear unit for automotive vehicles.

In accordance with this invention, a worm and gear assembly has the worm and gear parts thereof equipped with ball raceways and a column of ball bearings advances along these raceways to mesh the worm and gear together without the aid of intermeshing gear teeth. The worm has an hourglass configuration with a helical groove extending therearound between the opposite ends thereof at a desired pitch for easy rolling of a column of ball bearings therein. This hourglass worm is surrounded by a cage. A gear or sector extends through a slot in the cage into confronting relation with the helically grooved portion of the hourglass-shaped worm. The gear has transverse grooves forming ball raceways to mate with the helical groove on the worm. In the preferred embodiment, the worm has a hollow axis receiving a ball return tube therein. The return tube communicates with passageways in the worm at the ends of the spiral grooves, so that the balls issuing from one end of the groove are fed back to the other end.

The assembly of this invention is particularly suitable for automobile steering gears and is effective to reduce steering resistance and friction loads. In the steering gear embodiment of the invention, the worm member is rotatably mounted on anti-friction bearings in a gear housing. The gear member is similarly rotatably mounted on anti-friction bearing in the gear housing. The gear member is secured on a shaft carrying the pitman arm. The worm member is affixed to the steering column. The assembly is compact and permits a continuous flow of ball bearings whenever the worm is rotated to create a progression of ball bearings in thread-like engagement with the gear.

While the invention will hereinafter be specifically described as embodied in an automobile steering gear, it should be understood that the principles of the invention are generally applicable to worm and gear combinations wherever used, and the invention is therefore not limited to the preferred illustrated embodiment.

An important feature of the invention is the simplification of anti-friction gear assemblies by utilization of a simple cage to retain the anti-friction bearings in their raceways.

Another feature of the invention resides in the provision of a return tube arrangement for the anti-friction bearings which does not increase the overall dimensions of the assembly.

A still further feature of the invention resides in the provision of an hourglass-shaped worm member for increasing the intermeshed area of the worm with its coacting gear to distribute the load throughout a plurality of rows of anti-friction bearings.

It is, then, an object of this invention to provide a compact, efficiently operating anti-friction gear assembly.

Another object of the invention is to provide a steering gear for automotive vehicles wherein a worm member and a gear member are interconnected by a column of advancing ball bearings seated in raceways provided in the members.

A still further object of the invention is to provide an anti-friction type worm and gear assembly wherein an hourglass-shaped worm member has a helical groove forming a ball raceway and wherein a gear in confronting relation to the worm has a plurality of transverse grooves forming coacting raceways to receive ball bearings from the worm and cause rotation of the sector as the worm is rotated.

A still further object of the invention is to provide a worm and gear assembly utilizing a column of ball bearings to connect the members wherein the ball bearings travel through a return path located inside the worm member so that the overall dimensions of the assembly are not increased.

A still further object of the invention is to provide a worm and gear assembly wherein an hourglass-shaped worm member has a helical ball race therearound and is encased in a cage which holds ball bearings in the groove.

Other and further objects of this invention will be apparent to those skilled in the art from the following detailed description of the annexed sheets of drawings which, by way of a preferred example only, illustrates one embodiment of the invention.

On the drawings:

Figure 1 is a longitudinal cross-sectional view of a steering gear assembly according to this invention.

Figure 2 is a fragmentary horizontal cross-sectional view, with parts in top plan, taken along the line II—II of Figure 1.

Figure 3 is a transverse horizontal cross-sectional view, with parts in elevation, taken along the line III—III of Figure 1.

Figure 4 is a fragmentary front elevational view of the gear sector of the assembly of Figures 1 and 3.

As shown on the drawings:

In Figures 1 and 3, the steering gear assembly 10 includes a housing 11 rotatably mounting a worm 12 and a gear 13. As shown in Figure 1, the housing 11 has a hollow boss 11a projecting from one end thereof and providing a well 14 with a bottom affording a shoulder 15. A roller bearing assembly 16 has the outer race thereof seated in the well 14 and bottomed on the shoulder 15. The opposite end of the housing has an opening 11b aligned with the boss 11a and closed by a cover 17 secured to the housing by means of bolts 18. This cover 17 has an internally threaded bore receiving a threaded plug 19 therein. This plug has a well 20 in its inner face with a tapered mouth 20a. A roller bearing assembly 21 is seated on the tapered mouth 20a with the rollers utilizing the surface of the mouth as an outer race.

The worm member 12 has hollow trunnions 22 and 23 projecting from the ends thereof. Each of these trunnions has a tapered outer end 22a and 23a. The end 22a is seated in the roller bearing assembly 16 while the end 23a is seated in the roller bearing 21. A tapered roller bearing mounting capable of absorbing end thrust is thereby provided. End play of the bearing mounting for the worm 12 is controlled by positioning the plug 19 in the cover 17, since the raceway 20a can be moved toward and away from the shoulder 15. The plug 19 is locked in adjusted position by a lock ring 24 threaded thereon into abutting relation with the cover 17.

The boss 11a of the housing 11 receives a hollow steering column 25 freely therethrough. The end of this steering column is anchored in the trunnion 22 in fixed relation therewith.

The worm member 12 has a hollow axial passage 26 therethrough communicating at its ends with the hollow trunnions 22 and 23.

The worm member 12 has enlarged cylindrical rim ends 12a adjacent the trunnions 22 and 23 and a cylindrically concave portion 12b between these ends. The worm therefore has an hourglass shape with a minor diameter midway between the ends 12a. The concave portion 12b has a helical groove 12c therearound starting at one end 12a and ending at the other end 12a. This groove has a plurality of turns to give a freely flowing pitch for a column of ball bearings 27 movable therein. As shown, the groove has five turns or loops between the ends 12a. The groove 12b is of segmental circular cross section to receive the balls 27 in good rolling relation therein with about half of the ball surface being confined in the groove and the other half projecting from the groove.

The ends of the groove 12c adjacent the enlarged rims 12a communicate with holes 12d extending into the passage 26 as best shown in Figures 1 and 2. These holes 12d receive the balls 27 from the ends of the groove and feed them to a return tube 28 which is disposed in the passage 26 and has curved ends 28a fitted in recesses surrounding the inner ends of the holes.

As best shown in Figure 2, the end of the groove 12c adjacent the outer end of the holes 12d is blocked by a projection 12e on the worm 12 to guide the balls 27 into and out of the hole 12d. This projection 12e prevents jamming of the ball columns as the balls make the turn into or out of the hole 12d.

As best shown in Figure 3, the housing 11 has aligned open ends 11c and 11d at right angles to the boss 11a and open end 11b in laterally spaced relation therefrom. The open end 11c is closed by a cover 29 bolted to the housing by means of bolts 30. The cover 29 is internally threaded and receives a threaded plug 31 therein which has a well 32 with a tapered mouth 32a. A lock ring 33 on the plug and threaded down against the cover 29 locks the plug in adjusted position relative to the cover.

The opening 11d is closed by a hollow threaded plug 34 with a tapered mouth 34a at the end of the cylindrical bore 34b to the plug. A lock nut 35 is threaded on the plug and is bottomed against the end of the housing to lock the plug in adjusted position. Tapered roller bearing assemblies 36 and 37 are respectively seated in the tapered mouths 32a and 34a of the plugs 31 and 34 and the spaced relation of these bearings is readily controlled by adjustment of the plugs in their threaded sockets.

The gear member 13 is in the form of a half gear sector 13a with a cylindrical hub 13b having tapered ends 13c seated in the bearing assemblies 36 and 37 respectively. The hub 13b is fixedly anchored to a pitman shaft 38 projecting freely through the cylindrical bore 34b of the plug 34 and having a splined tapered end 38a receiving a pitman arm 39 thereon. This arm is wedge splined to the shaft 38 by a nut 40 threaded on the end of the shaft. The gear sector portion 13a projects from the hub 13b into confronting relation with the hourglass portion 12b of the worm 12. The sector 13a has a half circular periphery as shown in Figure 1 with a cylindrically concave face 13d as best shown in Figure 4. A plurality of transverse sloping grooves 13e extend across the face 13d to register with a plurality of the turns of the helical groove 12c in the worm.

A cage 41 matingly surrounds the worm 12 and having a cross-sectionally cylindrical configuration also has cylindrical chamber 41a in the ends thereof closely confronting the cylindrical rims 12a of the worm, together with a cylindrically convex, negatively hourglass formed, central portion 41b closely confronting the concave portion 12b of the worm. As shown in Figure 3, the cage 41 includes a half-portion 42 of cross-sectionally semi-cylindrical configuration bottomed on a pad 43 provided in the housing and held on the pad by a bolt 44 extending through the housing and threaded into the portion 42. The cage 41 includes a second segmental cross-sectionally semi-cylindrical portion 45 which is cylindrically convex and negatively hourglass formed, mating with the portion 42 and having bolt holes therethrough receiving bolts 46 which are threaded into the portion 42 to lock the two halves together. The portion 45 has a slot 47 receiving the gear sector 13a therethrough.

The cage 41 mating with the worm 12 is effective to hold the column of balls in the groove 12c of the worm, since it closely conforms with the hourglass configuration of the worm portion 12b and forms an outer race for the balls. The slot 47 in the cage freely receives the gear sector 13a therethrough but, as shown in Figure 3, is not large enough to permit the balls to pass between the gear sector and the cage. The gear sector is centered in the slot by adjustment of the plugs 31 and 34.

When the steering column 25 is rotated to rotate the worm 12, the pitch of the helical groove 12c in the worm advances the column of balls in the direction of rotation. In so advancing, the balls roll into the grooves 13e of the gear sector 13a to cause the gear to rotate and thereby drive the pitman shaft 38 for swinging the pitman arm 39.

As shown in Figure 1, the concave hourglass shape of the worm and the circular shape of the gear places the worm and gear in confronting relationship along an extended arc so that a plurality of rows of balls will connect the worm and gear in threaded relation. As shown in Figure 3, each groove 13e of the gear sector receives a plurality of balls along its length. Therefore, the load is borne by a plurality of balls in each groove and by a plurality of balls in a plurality of grooves.

It will be appreciated that the gear sector 13a could be a full circular gear if complete rotation of the shaft 38 is desired.

As the balls 27 advance along their helical path, they eventually issue out of the end of the helical path into one of the passages 12d depending upon the direction of rotation of the worm. The balls are then immediately fed back to the other end of the path so that a continuous column of balls is maintained.

The housing 11 carries two pairs of aligned bearing supports in right angular relation. End play in the worm assembly is adjusted by the plug 19 and position and end play of the gear assembly 13 is adjusted by the opposed plugs 31 and 34.

From the above descriptions it will therefore be understood that the invention provides an anti-friction ball bearing steering gear assembly for automotive vehicles wherein a worm and gear member are connected in intermeshed relationship through a column of balls which advance in a helical path as the worm member is rotated to effect a rotation of the gear member.

It will be understood that modifications and variations may be effected without departing from the scope of the novel concepts of the present invention.

I claim as my invention:

1. A ball gear assembly which comprises a worm member having an hourglass-shaped section with a multi-turn helical groove therearound and an axial passage therein, arcuate ended tube means in said passage connecting opposite ends of said helical groove, an arcuate gear member confronting said hourglass section and having transversely extending grooves adapted to register with a plurality of turns of said helical groove, and a column of ball bearings in said helical groove arranged to advance across said transverse grooves when the worm member is rotated for driving the gear member.

2. A worm and gear assembly comprising a casing, an hourglass shaped worm member having a multi-turn helical groove therearound and an axial hollow therein, a passage connecting the ends of said groove, said passage including a tubular guide member interconnecting ends of said groove radially through said worm member and axially through said hollow, a gear member confronting said worm having a plurality of transversely extending grooves arranged for registration with a plurality of turns of said helical groove in the worm member, a column of ball bearings filling said helical groove and said passage connecting the ends of the groove, and a cage surrounding said worm member in spaced confronting relation therewith for confining the column of balls in the helical groove whereby rotation of the worm member advances the column of balls along the helical groove to move through the transverse grooves in registration with the helical groove for rotating the gear member.

3. A steering gear comprising a housing, two pairs of bearing supports in right angle relation in said housing, each pair of supports including a pair of axially aligned bearings at least one support of each of said pairs being movable in said housing for adjusting the axial spacing of the bearings, an axially hollow worm member rotatably mounted in the first pair of bearings, a gear member rotatably mounted in the second pair of bearings, said worm and said gear having registering passages, the passage in said worm having ends interconnected by tubular guide means extending into the axial hollow in said worm member and a column of ball bearings in said passages effecting threaded relationship between the worm and gear.

4. In a worm and gear assembly the improvement of a worm member having a cylindrically concave portion provided with a multi-turn helical groove therearound, said groove having a generally segmental circular cross-section, said worm member having trunnion portions extending endwise from said concave grooved portion, said concave grooved portion and at least one of said trunnion portions being hollowed to provide an accessible axial passage, said helical groove terminating at each end in a radial passage extending through said worm member and terminating in a recess opening upon said axial passage, and a ball return tube fittable within said axial passage and having curved ends fitted in said recesses to place said radial passages in interior communication.

JAMES H. BOOTH.

References Cited in the file of this patent

UNITED STATES PATENTS

| Number | Name | Date |
|---|---|---|
| 1,152,001 | Brinkman | Aug. 31, 1915 |
| 1,661,988 | Ayres | Mar. 6, 1928 |
| 1,967,482 | Schmidt | July 24, 1934 |
| 2,404,378 | Hoffar | July 23, 1946 |
| 2,406,028 | Myers | Aug. 20, 1946 |
| 2,451,998 | Wahlberg et al. | Oct. 19, 1948 |
| 2,455,487 | Hoffar | Dec. 7, 1948 |
| 2,520,784 | Schlicksupp | Aug. 29, 1950 |

FOREIGN PATENTS

| Number | Country | Date |
|---|---|---|
| 575,221 | France | Apr. 17, 1924 |